United States Patent [19]

Ozawa et al.

[11] Patent Number: 4,578,707

[45] Date of Patent: Mar. 25, 1986

[54] METHOD OF REDUCING VERTICAL SMEARS OF A SOLID STATE IMAGE SENSOR

[75] Inventors: Naoki Ozawa, Kokubunji; Toshiyuki Akiyama, Kodaira; Shuusaku Nagahara, Hachiouji; Shinya Ohba, Tukui; Haruhisa Ando, Nishitama; Toshifumi Ozaki, Hachiouji, all of Japan

[73] Assignee: Hitachi, Ltd., Tokyo, Japan

[21] Appl. No.: 662,133

[22] Filed: Oct. 18, 1984

[30] Foreign Application Priority Data

Oct. 18, 1983 [JP] Japan .................................. 58-194685
Oct. 18, 1983 [JP] Japan .................................. 58-194686

[51] Int. Cl.$^4$ .............................................. H04N 3/12
[52] U.S. Cl. .................................................. 358/212
[58] Field of Search .................. 358/213, 41, 44, 167, 358/209, 212, 163

[56] References Cited

U.S. PATENT DOCUMENTS

| 4,010,319 | 3/1977 | Levine ................................... 358/213 |
| 4,067,046 | 1/1978 | Nakatani et al. ...................... 358/167 |
| 4,240,116 | 12/1980 | Tomlinson, Jr. ..................... 358/213 |
| 4,336,557 | 6/1982 | Koch ..................................... 358/213 |
| 4,510,528 | 4/1985 | Bergen .................................. 358/213 |

*Primary Examiner*—Gene Z. Rubinson
*Assistant Examiner*—Stephen Brinich
*Attorney, Agent, or Firm*—Antonelli, Terry & Wands

[57] ABSTRACT

Herein disclosed is a method of reducing the vertical smears which are generated in a solid state image sensor including a plurality of vertical signal lines for transferring signal charges in a vertical direction and at least one charge transfer device for transferring the signal charges in a horizontal direction.

The smear charges stored in the vertical signal lines and the signal charges generated in a photoelectric conversion element in response to an incident ray are inputted separately of each other for a horizontal blanking period to the charge transfer device for the horizontal transfer. During a tracing period, a smear voltage and a signal voltage are outputted separately of each other from said charge transfer device. The smear voltage adjusted is subtracted from the signal voltage to eliminate the smear component which has been mixed into the signal voltage.

18 Claims, 44 Drawing Figures

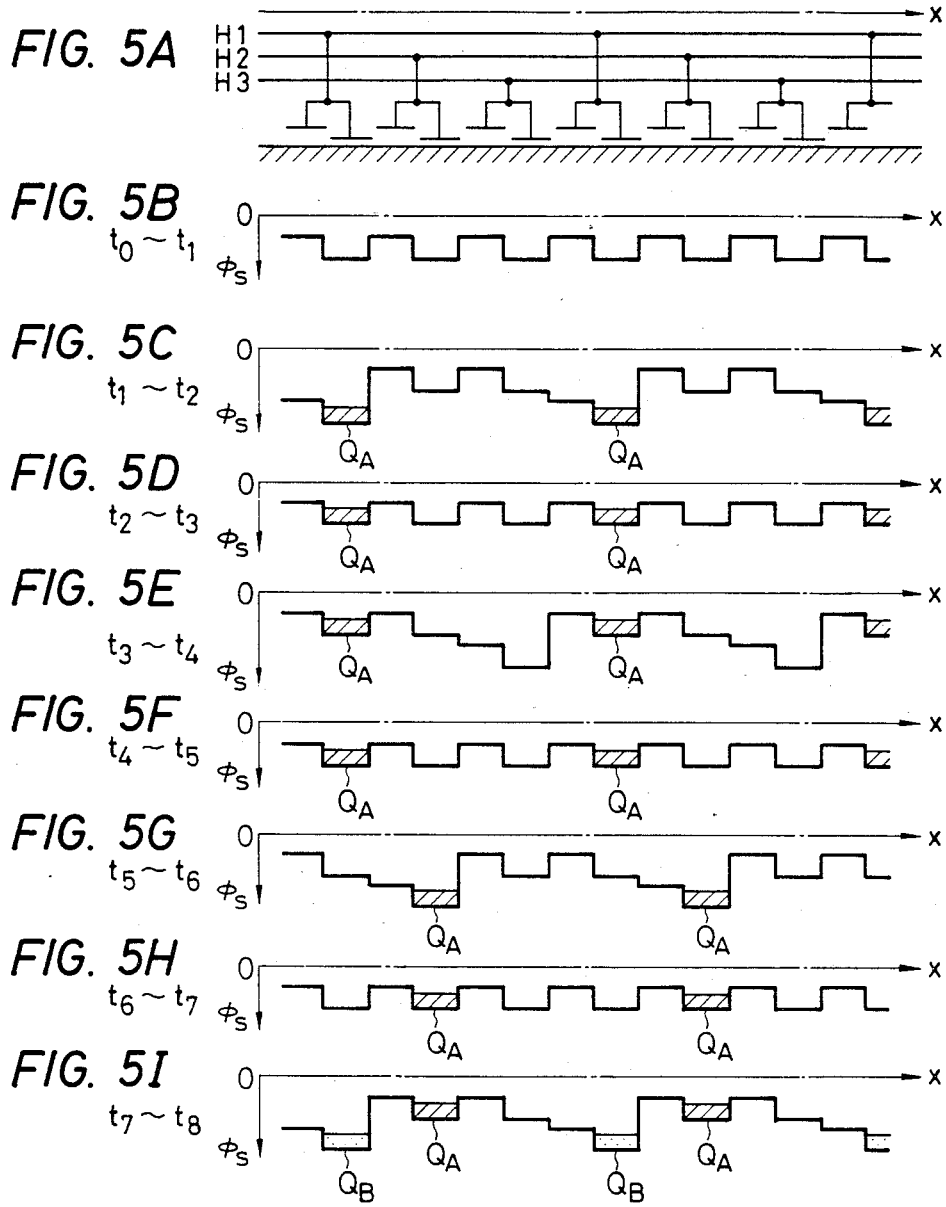

FIG. 5J  $t_8 \sim t_9$
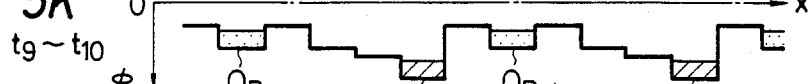
FIG. 5K  $t_9 \sim t_{10}$
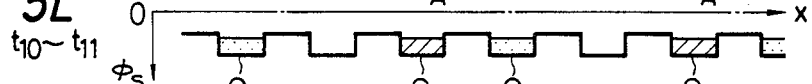
FIG. 5L  $t_{10} \sim t_{11}$
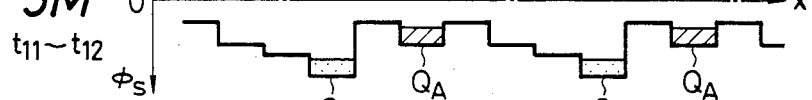
FIG. 5M  $t_{11} \sim t_{12}$
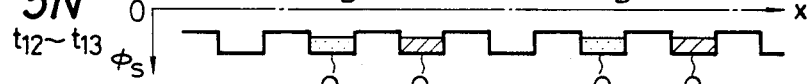
FIG. 5N  $t_{12} \sim t_{13}$
FIG. 6A  H1
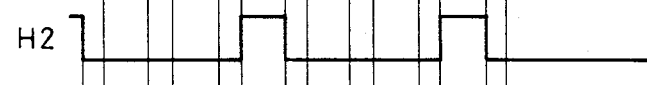
FIG. 6B  H2
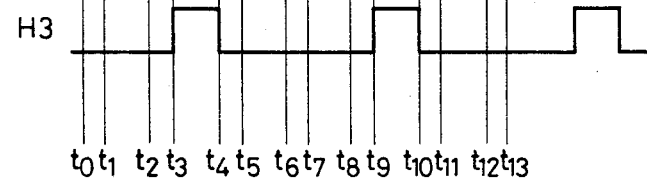
FIG. 6C  H3

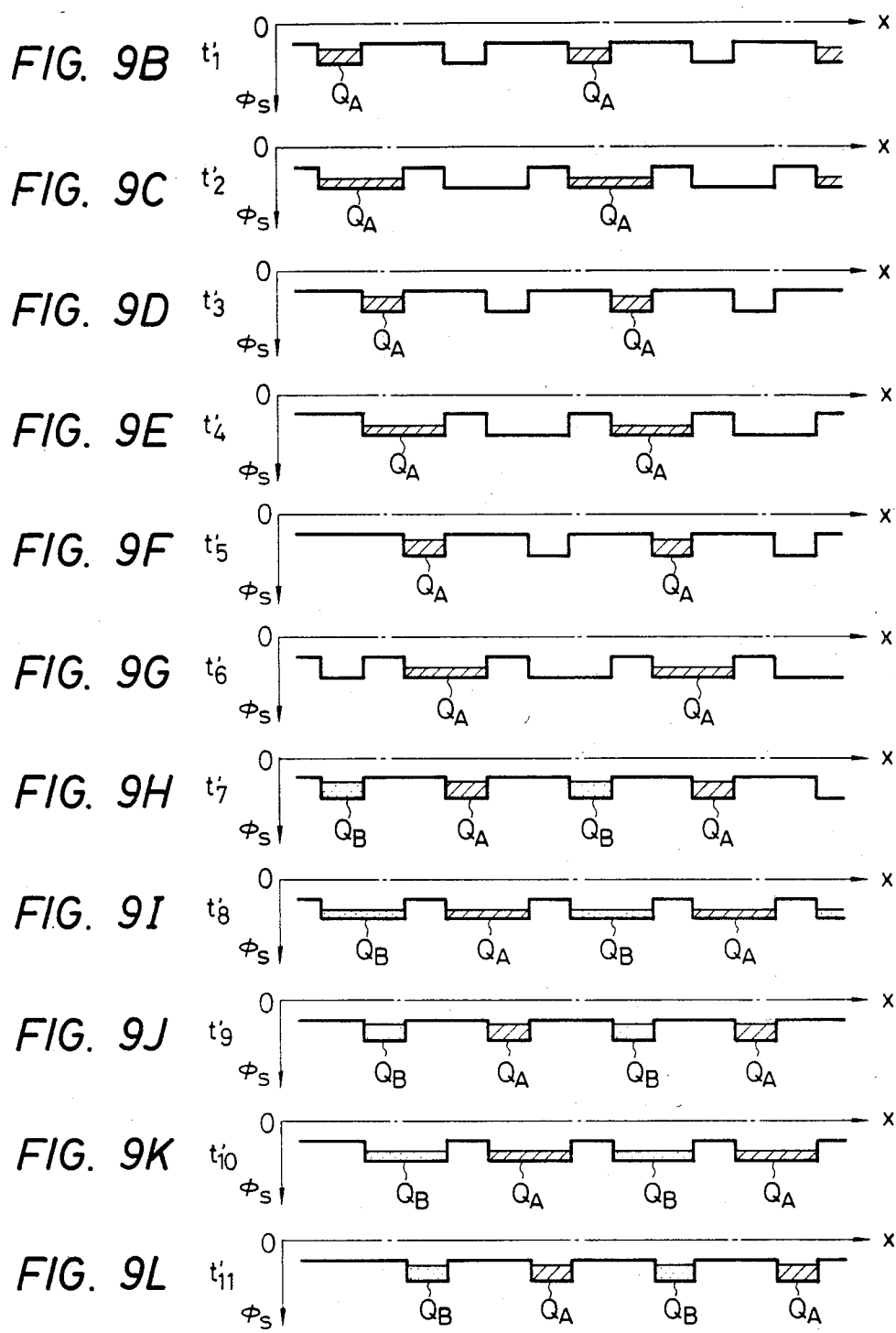

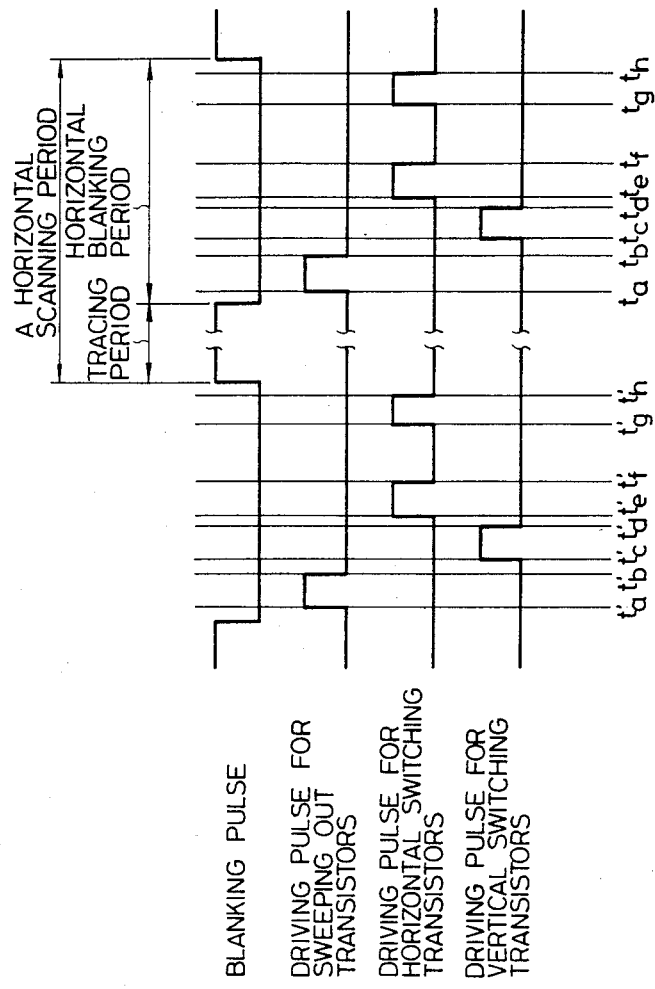

METHOD OF REDUCING VERTICAL SMEARS OF A SOLID STATE IMAGE SENSOR

BACKGROUND OF THE INVENTION

The present invention relates to a method of reducing the vertical smears to be generated in a solid state image sensor of the type including a plurality of photoelectric conversion elements arrayed regularly in horizontal and vertical directions, a plurality of vertical signal lines for transferring signal charges in a vertical direction, and at least one charge transfer device for transferring the signal charges in a horizontal direction, and a solid state imaging device for practicing the vertical smear reducing method.

One example of the solid state image sensor of this type is disclosed in European patent application Publication No. 0,054,244. The equivalent U.S. patent is U.S. Pat. No. 4,443,818.

The structure of the solid state image sensor of this type is shown in FIG. 1. With reference to this Figure, the operations of the solid state image sensor of this type will also be described.

The output pulses, which are consecutively sent to the output lines $2_1$, $2_2$, - - -, and $2_m$ of a vertical shift register 1, are added to an interlace circuit 3 so that output pulses are generated at output lines $4_1$, $4_3$, - - -, and $4_{2m-1}$ in an odd field and at output lines $4_2$, $4_4$, - - -, and $4_{2m}$ in an even field. As a result, during a first horizontal scanning period of the odd field, vertical switching transistors $5_{1-1}$, $5_{1=2}$, - - -, and $5_{1-n}$ are simultaneously turned on so that the signal charges generated in photo diodes $6_{1-1}$, $6_{1-2}$, - - -, and $6_{1-n}$ are transferred to vertical signal lines $7_1$, $7_2$, - - -, and $7_n$ correspondingly thereto, respectively. Likewise, during a first horizontal scanning period of the even field, vertical switching transistors $5_{2-2}$, $5_{2-2}$, - - -, and $5_{2-n}$ are simultaneously turned on so that the signal charges generated in photo diodes $6_{2-1}$, $6_{2-2}$, - - -, and $6_{2-n}$ are transferred to the vertical signal lines $7_1$, $7_2$, - - -, and $7_n$. By the ON signal from a control terminal 9, moreover, horizontal switching transistors $8_1$, $8_2$, - - -, and $8_n$ are simultaneously turned on so that the signal charges of the vertical signal lines $7_1$, $7_2$, - - -, and $7_n$ are transferred to a charge transfer device 10 (which will be shortly referred to as "CTD"). This CTD 10 acts as a horizontal shift register.

Here, a portion having photosensitivity is desired to be limited to a portion of a photo diode 6. As a matter of fact, however, the peripheral portion of the photo diode 6, e.g., the drain of a vertical switching transistor (e.g., a MOS transistor) 5 may have the photosensitivity. Those charges generated in the drain of the transistor 5 are transferred to the vertical signal lines 7 irrespective of the conductivity of the vertical switching transistors 5. With the respective vertical signal lines 7, however, there are connected all the drains of hundreds of vertical switching transistors 5 arrayed in the vertical direction so that the charges generated in all the drains are mixed and added until they are stored in the vertical signal lines 7. The charges thus stored are obtained such that they are superimposed on the normal signal charges generated in the photo diodes 6 for the respective horizontal scanning periods. As a result, if an object having such a bright portion as is shown in FIG. 2A, for example, is imaged, a vertical smear of the bright portion appears in a reproduced frame, as shown in FIG. 2B. This noise component intrinsic to the solid state image sensor is called the "vertical smear."

The magnitude of the charges resulting in the vertical smear is proportional to their storage period in the vertical signal lines. When the horizontal switching transistors 8 are turned on, more specifically, the magnitude of the vertical smear charges to be transferred to the horizontal CTD is proportional to the period from the instant when the horizontal switching transistors 8 are previously turned off.

With this in mind, sweeping out transistors $11_1$, $11_2$, - - -, and $11_n$ equipped with a common control terminal 13 are connected in parallel with the horizontal switching transistors $8_1$, $8_2$, - - -, and $8_n$ such that they are turned on during the horizontal blanking period.

FIG. 3 is a time chart showing the driving pulses of FIG. 1. During the period $t_a-t_b$ in the horizontal blanking period as shown in FIG. 3, a sweeping out transistor 11 is first supplied with a driving pulse to sweep out from a sweeping out terminal 12 to the outside the vertical smear charges $Q_{V1}$ which are stored on and after the ON period $(t_e'-t_f')$ before the one horizontal scanning period. Subsequently, during a period $t_c-t_d$, the vertical switching transistors 5 are turned on to transfer the signal charges $Q_S$ of the photo diodes 6 to the vertical signal lines 7, and during the period $t_e-t_f$ the horizontal switching transistors 8 are turned on to transfer the signal charges $Q_S$ to the horizontal CTD. At this time, into these signal charges, there are mixed the vertical smear charges $Q_{V2}$ which are stored in the period $t_b-t_f$.

As a result of the transfer during the horizontal scanning period, the charges obtained from the output of the horizontal CTD 10 are converted by the gate capacitor $C_G$ of a source follower transistor 14 into such a voltage signal $V_{out}$ as is expressed by the following Equation until it appears at an output terminal 15:

$$V_{out} = \frac{Q_S + Q_{V2}}{C_G} \quad (1)$$

Here, if the one horizontal scanning period $T_0$ and the period $t_b-t_f$ are designated by $T_0$ and $T_1$, respectively, the ratio a between the vertical smear charges $Q_{V0}(=Q_{V1}+Q_{V2})$ without the sweeping out operation and the vertical smear charges $Q_{V2}$ with the sweeping out operation is expressed by the following Equation:

$$a = Q_{V2}/Q_{V0} = T_1/T_0 \quad (2)$$

Since the one horizontal scanning period and the horizontal blanking period are about 64 $\mu$S and 11 $\mu$S, respectively, the ratio a is smaller than 1/6. Thus, a remarkable improvement can be obtained by conducting the sweeping out operation. In order to prevent the generation of the vertical smears for all the objects, however, that ratio has to be reduced to about 1/100.

In the aforementioned European Patent Application Publication No. 0,054,244, there is disclosed the steps of: transferring the noise charges, which are stored in vertical signal lines, to a horizontal CTD prior to the reading out of signal charges from photoelectric conversion conversion elements such as photo diodes located on horizontal lines a and b; reading out the signal charges and the noise charges from the horizontal CTD; and eliminating the noise charges mixed in the signal charges by subtracting the noise charges from the signal charges.

Despite this fact, however, the European Patent Application merely discloses the above-specified principle but does not disclose a method of accurately eliminating noise components from a signal.

SUMMARY OF THE INVENTION

An object of the present invention is to provide a method of accurately eliminating the smear components which are mixed in a signal.

Another object of the present invention is to provide a solid state imaging device which can output a video signal having its smear components eliminated accurately.

These objects can be achieved by the method of the present invention comprising the steps of:

transferring smear chages stored in vertical signal lines to horizontal transfer means;

transferring signal charges from photoelectric conversion elements to said vertical signal lines, and transferring said signal charges from said signal lines to said horizontal transfer means;

transferring said smear charges and said signal charges in a separate state to an output terminal by said horizontal transfer means;

generating a smear voltage corresponding to said smear charges and a signal voltage corresponding to said signal charges at the output terminal of said horizontal tranfer means;

adjusting the magnitude of said smear voltage at a predetermined ratio; and subtracting said adjusted smear voltage from said signal voltage to reduce the smear component contained in said signal voltage.

BRIEF DESCRIPTION OF THE DRAWINGS

FIGS. 5A to 5N are charts for explaining the structure and operations of the horizontal CTD of the embodiment of FIG. 4;

FIGS. 6A to 6C are charts showing clock pulses for driving the horizontal CTD of FIG. 5A;

FIGS. 9A to 9L are charts for explaining the structure and operations of another example of the horizontal CTD to be used in the present invention;

FIG. 17 is a timing chart showing still other driving pulses according to the present invention.

DETAILED DESCRIPTION OF THE PREFERRED EMBODIMENTS

Figure 4:
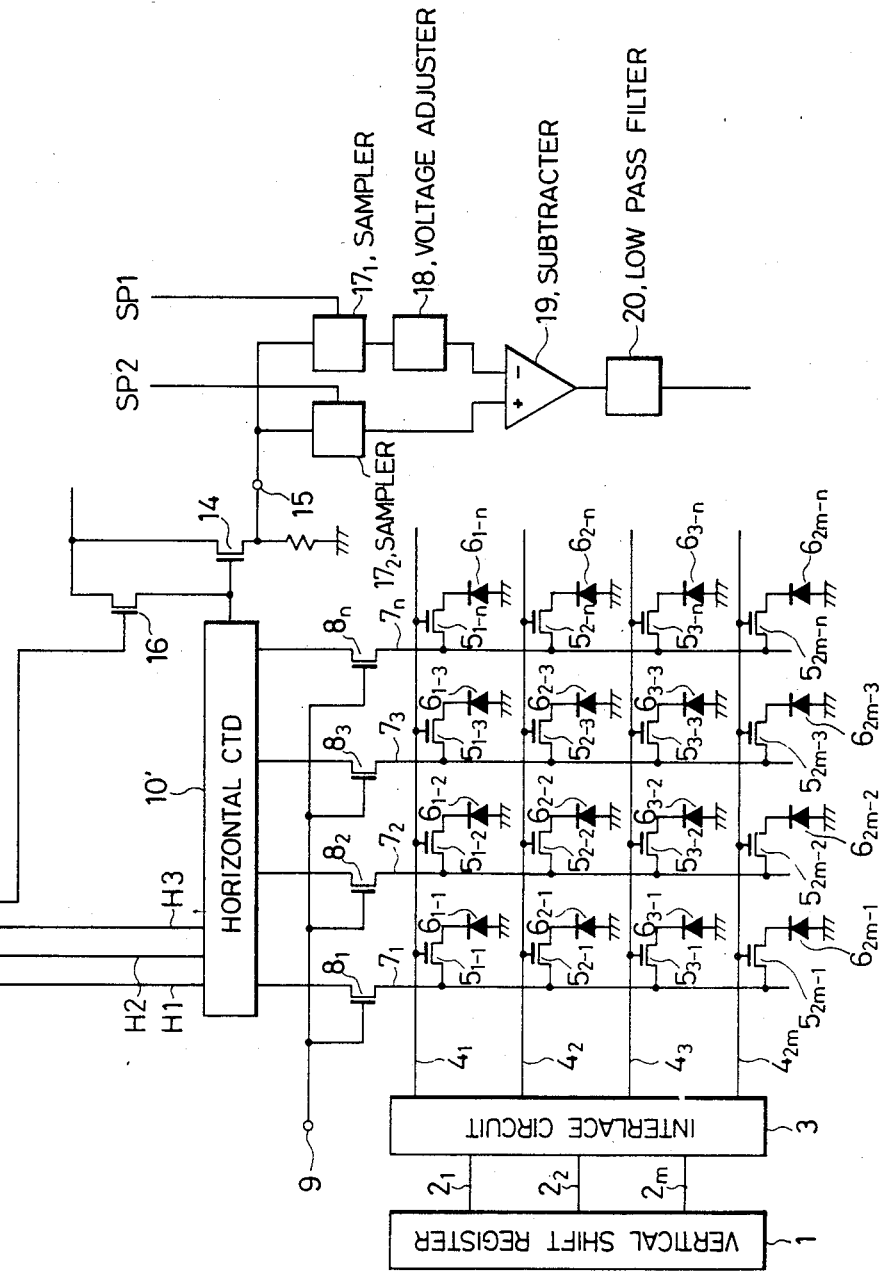
FIG. 4 is a circuit diagram showing a solid state imaging device according to one embodiment of the present invention.

FIG. 4 is a circuit diagram showing the solid state imaging device according to one embodiment of the present invention.

In order to transfer most of the charges of vertical smears separately of signal charges, as shown in FIG. 4, a horizontal CTD 10' has a three-phase electrode structure, and sampling circuits $17_1$ and $17_2$, a voltage adjusting circuit 18, a subtracting circuit 19 and a low pass filter 20 are newly added to the output side of the horizontal CTD 10' so that the vertical smears mixed in the signal charges are eliminated by subtraction.

Figure 1:
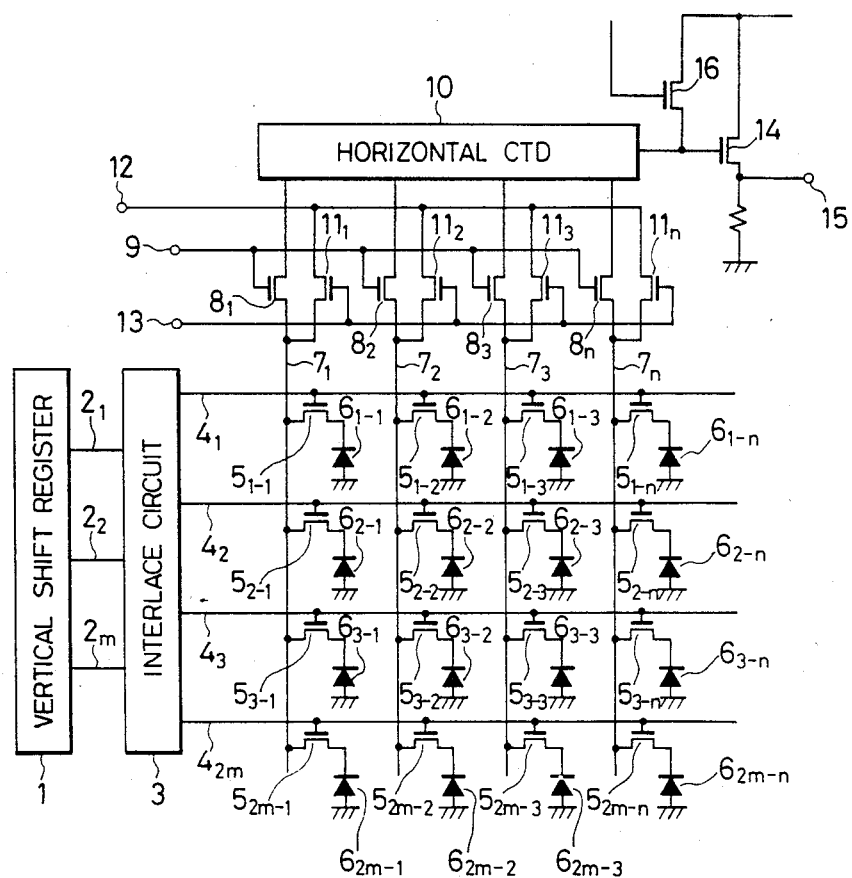
FIG. 1 is a circuit diagram showing the solid state image sensor according to the prior art.
Figure 2A:
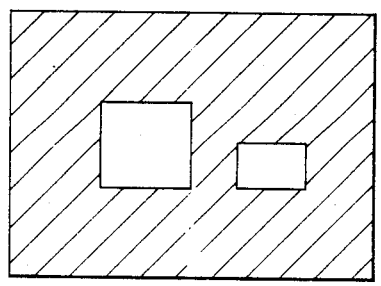
FIGS. 2A and 2B are diagrams showing an object image and a vertical smear appearing in a reproduced frame in a manner to accompany the former respectively.
Figure 2B:
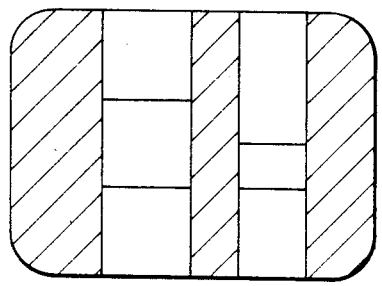
Figure 3:
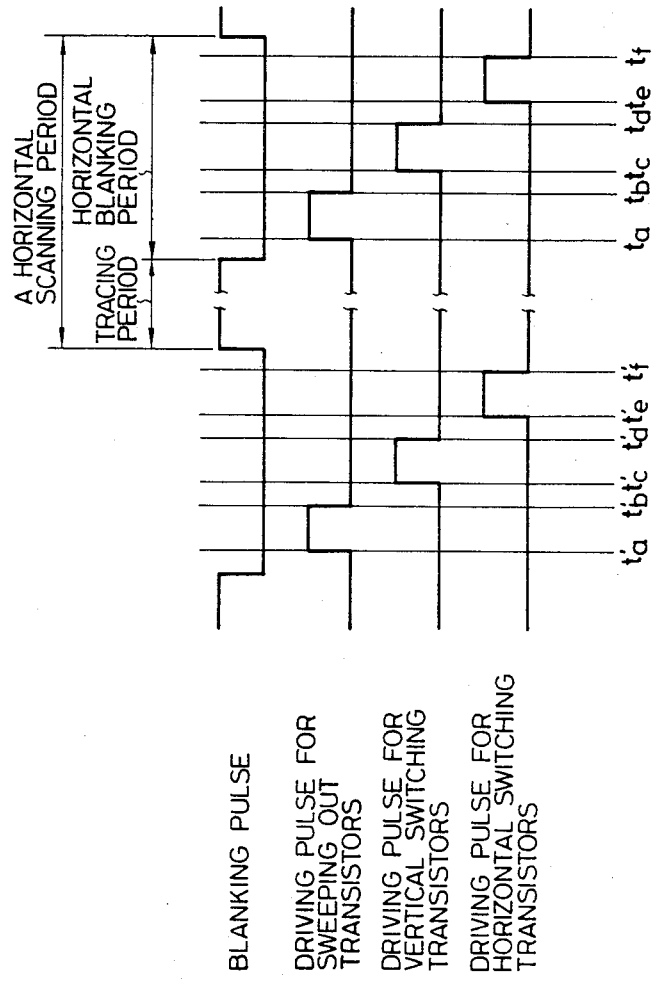
FIG. 3 is a timing chart showing the driving pulses of elements of FIG. 1.

In FIG. 4, there exists no element which corresponds to the sweeping out transistors 11 of FIG. 1.

FIGS. 5A to 5N are charts showing the three-phase electrode structure of the horizontal CTD 10' of FIG. 4 and the transitions of internal potentials, and an abscissa x designates a distance whereas an ordinate $\phi_s$ designates a potential.

The horizontal CTD 10' of FIG. 4 has such a structure as is shown in FIG. 5A. More specifically, each of charge storage regions is constructed of a combination of: one electrode exhibiting a potential well which is relatively shallow relative to an identical voltage applied; and one electrode exhibiting potential well which is relatively deep. Three-phase pulses are applied to the adjacent three storage regions, i.e., three groups of electrodes. One stage of that CTD is composed of those three groups of electrodes which are driven in three phases. A plurality of stages thus composed are arrayed in a charge transferring direction. Each stage corresponds to each of the aforementioned horizontal switching transistors 8 and each of the vertical signal lines 7 connected with the former.

When all the clock pulses applied to the respective electrodes of the CTD 10' are at a low level, the potential wells corresponding to the respective electrodes are so repeatedly arrayed with one group of high and low potentials as are shown in FIG. 5B.

FIGS. 6A, 6B and 6C are time charts showing the clock pulses which are to be applied to the respective three-phase electrodes H1, H2 and H3 shown in FIG. 5A.

It is assumed here that the three-phase pulses having a clock frequency $f_c$, as shown in FIGS. 6A, 6B and 6C, are added to the respective electrodes H1, H2 and H3. Specifically: the pulses are applied to the electrode H1 at instants $t_1$, $t_7$, $t_{13}$ and so on; the pulses are applied to the electrode H2 at instants $t_5$, $t_{11}$, $t_{17}$ and so on; and the pulses are applied to the electrode H3 at instants $t_3$, $t_9$, $t_{15}$ and so on. As a result, the potential wells at the respective periods $t_0-t_{13}$ are transmitted to the states shown in FIGS. 5B to 5N. Here, reference letters $Q_A$ and $Q_B$ on the potential wells indicate the signal charges or vertical smear charges which are sent from the vertical signal lines 7. If the horizontal switching transistors 8 are connected with the portion corresponding to the H1 electrode of the horizontal CTD 10' so that they are turned on for the periods $t_1-t_2$ and $t_7-t_8$, respectively, as shown in FIGS. 5C to 5N, the two charges $Q_A$ and $Q_B$ can be taken into each of the stages composed of three groups of three-phase driven electrodes so that they can be transferred in a separate manner. In FIG. 5C, more specifically, the electrode H1 takes a lower potential, because it is supplied with the pulse for the period $t_1-t_2$, and the charges $Q_A$ are sent from the vertical signal lines 7 by turning on the horizontal switching transistors 8. Next, as shown in FIG. 5E, the electrode H3 is supplied with the pulse for the period $t_3-t_4$ so that it takes a low potential but with the charges $Q_A$ being unmoved. Next, as shown in FIG. 5G, the electrode H2 is supplied with the pulse for the period $t_5-t_6$ so that it takes a lower potential so that the charges $Q_A$ are transferred from an adjacent high potential. Next, as shown in FIG. 5I, the electrode H1 is supplied with the pulse for the period $t_7-t_8$, and the horizontal switching transistors 8 are turned on so that the charges $Q_B$ are sent from the vertical signal lines 7. FIGS. 5J to 5N show the states in which the two charges $Q_A$ and $Q_B$ are transferred separately of each other to each of the stages composed of three storage regions formed below three groups of three-phase driven electrodes.

Figure 7:
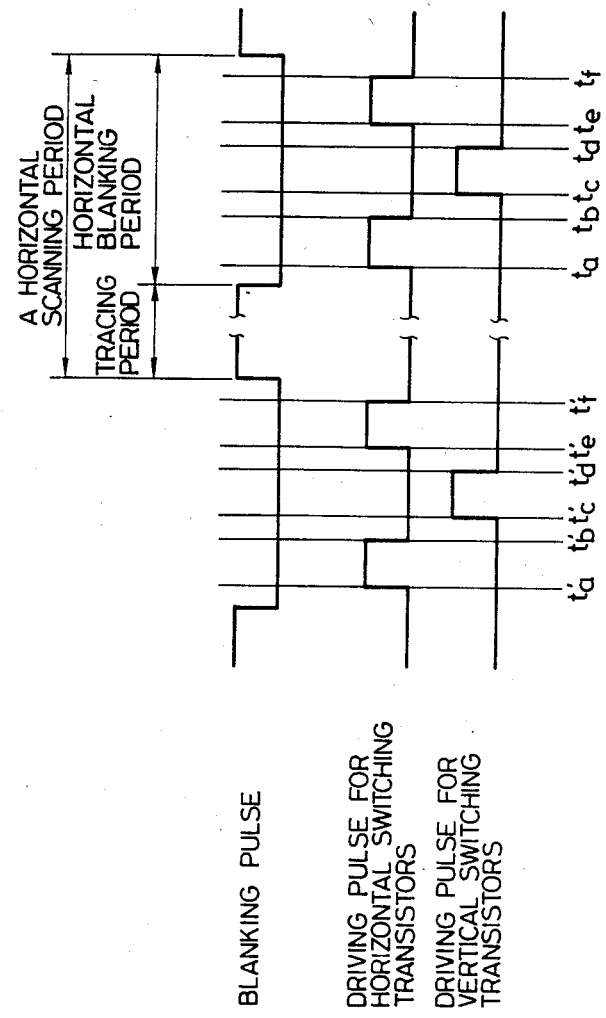
FIG. 7 is a timing chart showing the driving pulses of the embodiment of FIG. 4.
Figure 8:
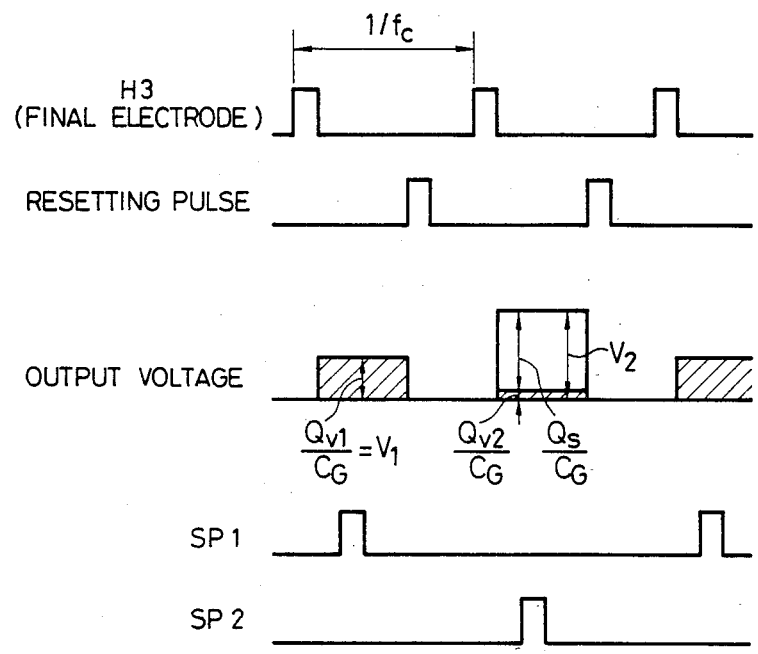
FIG. 8 is a chart showing the output voltage and sampling pulses of the embodiment of FIG. 4.

FIG. 7 shows the pulses for driving the switching transistors of the solid state imaging device of the present invention. FIG. 8 is a chart for explaining the output waveforms of FIG. 4.

The one horizontal scanning period is composed of: a tracing period for actually sending out a video signal; and a horizontal blanking period from the instant when the scanning operation of one scanning line is ended to the instant when the initial scanning point is restored. In the present invention, as shown in FIG. 7, the horizontal switching transistors 8 are turned on for the period $t_a-t_b$ for the horizontal blanking period to transfer the vertical smear charges $Q_{V1}$ (which corresponds to $Q_A$ of FIG. 5A, which are stored for the period from $t'_f$ in the preceding horizontal period to $t_b$, to the horizontal CTD 10'. The operations during this period correspond to those for the period $t_1-t_2$ shown in FIGS. 5C and FIGS. 6A to 6C. Subsequently, during the period $t_c-t_d$ of FIG. 7, the vertical switching transistors 5 are turned on to transfer the signal charges $Q_S$ of the photo diodes 6 to the vertical signal lines 7, and the charges $Q_B$ are transferred to the horizontal CTD 10' by turning on again the horizontal switching transistors 8 for the period $t_e-t_f$. The charges $Q_B$ are the sum of the aforementioned signal charges $Q_S$ and the vertical smear charges $Q_{V2}$ which are stored for the period $t_b-t_f$.

Incidentally, the operations for the periods $t_b-t_e$ and $t_e-t_f$ in FIG. 7 correspond to the operations for the period $t_2-t_7$ of FIGS. 5D to 5H and for the period $t_7-t_8$ of FIG. 5I, respectively. For the horizontal scanning period, moreover, if the horizontal CTD 10' is driven by the three-phase clock pulse of FIGS. 6A, 6B, 6C with the horizontal switching transistors 8 being held inoperative, the two charges $Q_A$ and $Q_B$ are transferred separately of each other to the output terminal of the horizontal CTD 10'.

Thus, as shown in FIG. 7, by turning on the horizontal switching transistors 8 for the period $t_a-t_b$, the vertical smear charges $Q_{V1}$ stored for the period $t'_f-t_b$ are transferred to the horizontal CTD 10'. By turning on the horizontal switching transistors 8 for the period $t_e-t_f$, both the signal charges $Q_S$ transferred to the vertical signal lines 7 for the period $t_c-t_d$ and the vertical smear charges $Q_{V2}$ stored for the period $t_b-t_f$ are transferred to the horizontal CTD 10'. In other words, there are mixed in the signal charges the vertical smear charges $Q_{V2}$ which are stored for the period $t_b-t_f$. Now, if the period $t'_f-t_b$ is designated by $T_1$ whereas the period $t_b-t_f$ is designated by $T_2$, the relationship between the vertical smear charges $Q_{V1}$ and $Q_{V2}$ is expressed by the following Equation, because the one horizontal scanning period is 64 $\mu$S whereas the horizontal blanking period is about 11 $\mu$S:

$$Q_{V1} = \frac{T_1}{T_2} \cdot Q_{V2} \quad (3)$$

$$\approx 5 \cdot Q_{V2}$$

Thus, only the vertical smear charges $Q_{V1}$ and the signal charges $Q_S$ having the vertical smear charges $Q_{V2}$ mixed therein are alternately outputted from the output terminal of the horizontal CTD 10'. This output is converted by the gate capacitor $C_G$ of the source follower transistor 14 into the voltage signal having the following relationship until it is sent out to the output terminal 15:

$$V_1 = \frac{Q_{V1}}{C_G} \quad (4)$$

$$V_2 = \frac{Q_S + Q_{V2}}{C_G} \quad (5)$$

The charges of the gate are swept out, before the subsequent charges are transferred from the horizontal CTD 10', by a resetting transistor 16 which is adapted to be turned on by a resetting pulse having a frequency equal to the clock frequency $f_c$.

In FIG. 8: there are shown the pulse which is applied to the final electrode H3 of the horizontal CTD 10'; the resetting pulse for turning on the resetting transistor 16; the output voltages $V_1$ and $V_2$ which are expressed by the foregoing Equations (4) and (5); and sampling pulses SP1 and SP2 which are to be applied to the sampling circuits $17_1$ and $17_2$.

The output voltages $V_1$ and $V_2$, which are obtained alternately for the clock frequency $f_c$, are applied separately of each other to the sampling circuits $17_1$ and $17_2$ shown in FIG. 4. These sampling circuits $17_1$ and $17_2$ are fed with the sampling pulses SP1 and SP2, respectively, so that they take the output voltages $V_1$ and $V_2$. The voltage $V_1$ thus separated by the sampling circuit $17_1$ is attenuated in the voltage adjusting circuit 18 in accordance with the ratio $T_2/T_1$ of the storage period $T_2$ of the smear charges $Q_{V2}$ to the storage time $T_1$ of the smear charges $Q_{V1}$. The voltage $(T_2/T_1)\cdot V_1$ is inputted together with the other voltage $V_2$ to the subtracting circuit 19. The voltage $V'_{out}$ obtained from this subtracting circuit 19 is expressed by the following equation:

$$V_{out} = V_2 - \frac{T_2}{T_1} \cdot V_1 \quad (6)$$

$$= \frac{Q_S + Q_{V2}}{C_G} - \frac{T_2}{T_1} \cdot \frac{Q_{V1}}{C_G}$$

Since the Equation of $Q_{V1}=(T_1/T_2)Q_{V2}$ is obtained from the foregoing Equation (3), the Equation (6) can be simplified into the following simple form:

$$V_{out} = \frac{1}{C_G} \cdot Q_S \tag{7}$$

Hence, if the output of the subtracting circuit 19 is added to the low pass filter 20, it is possible to obtain a signal from which the vertical smears are eliminated.

Incidentally, as shown in FIG. 5A, the horizontal CTD 10' used in this embodiment has the three-phase electrode structure having high and low potentials. Any CTD can be applied as the horizontal one of the present invention if it can transfer two or more changes by one group of plural storage regions.

FIGS. 9A to 9L are charts for explaining the electrode structure and potentials of the horizontal CTD according to another embodiment of the present invention, and an abscissa x designates a distance whereas an ordinate $\phi_S$ designates the potential. Moreover, FIG. 10 is a timing chart showing the driving pulses to be applied to the electrodes of FIG. 9A.

Figure 9A:
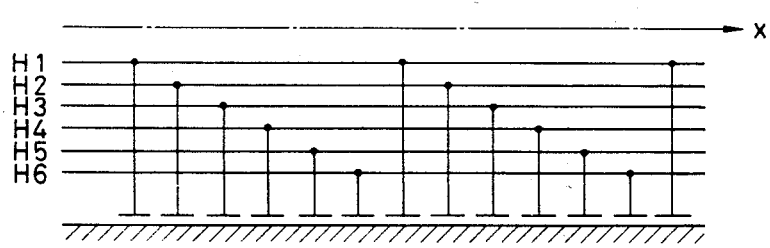
Figure 10:
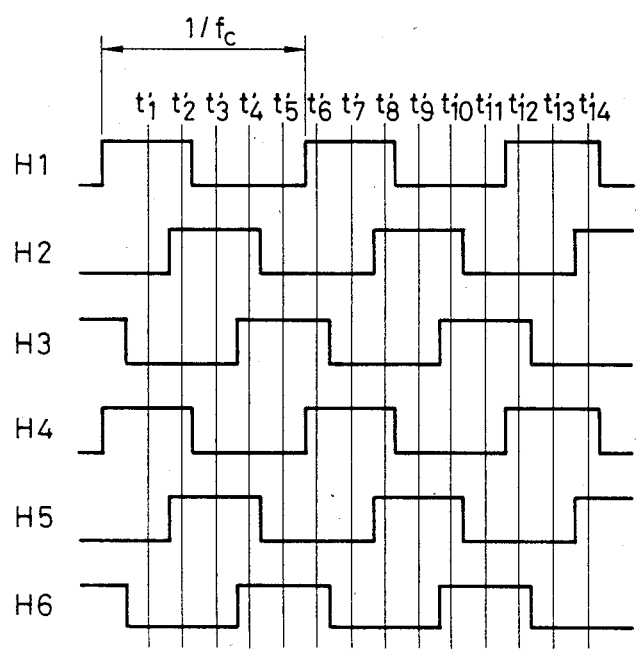
FIG. 10 is a chart showing clock pulses for driving the horizontal CTD of FIG. 9A.

FIG. 9A shows a six-phase electrode structure. By applying the six-phase pulses shown in FIG. 10 to the electrodes H1 to H6, the two charges $Q_A$ and $Q_B$ can be transferred separately of each other in the repetitions of the stages composed of the six electrodes.

In FIG. 9B, a pulse is applied to the electrodes H1 and H4 at an instant $t'_1$ so that the charges $Q_A$ are sent to the electrode H1 of the horizontal CTD. In FIG. 9C, a pulse is applied to the respective electrodes H1, H2, H4 and H5 at an instant $t'_2$ so that the charges $Q_A$ of the electrode H1 are extended to the electrode H2. In FIG. 9D, a pulse is applied to the electrodes H2 and H5 at an instant $t'_3$ so that the charges $Q_A$ are transferred to the electrode H2. In FIG. 9H, the pulse is again applied to the electrodes H1 and H4 at an instant $t'_7$ so that the charges $Q_A$ are transferred to the electrode H4 whereas the subsequent charges $Q_B$ are inputted to the electrode H1. In these ways, the two charges $Q_A$ and $Q_B$ are transferred separately of each other to each of the stages composed of the six storage regions formed below the six transfer electrodes.

Figure 11:
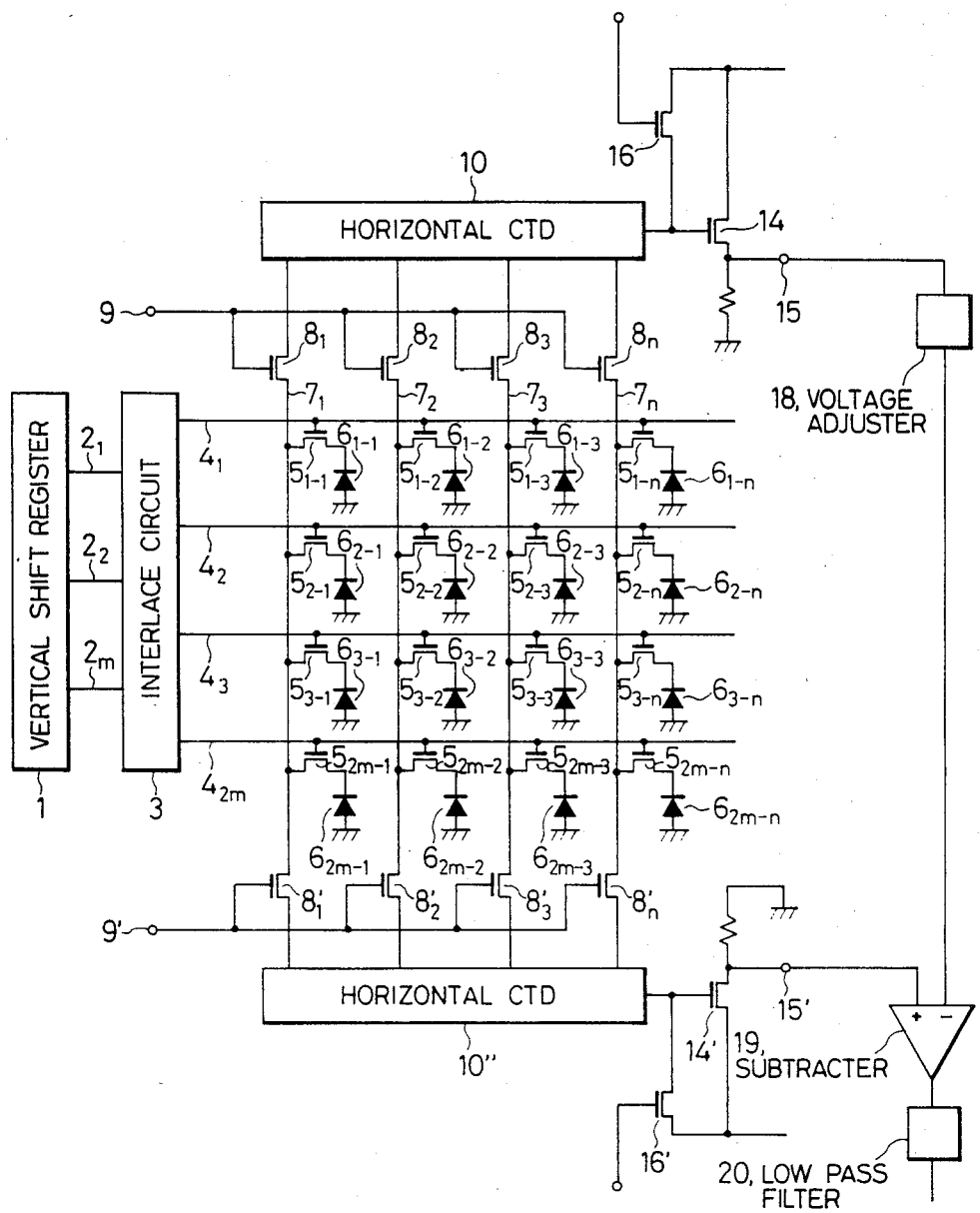
FIG. 11 is a circuit diagram showing the solid state imaging device according to another embodiment of the present invention.

FIG. 11 is a circuit diagram showing the structure of the solid state imaging device according to another embodiment of the present invention.

In the foregoing embodiment of FIG. 4, there has been described the method in which both the signal charges having the vertical smears mixed therein and only the vertical smears are transferred together by the single horizontal CTD 10'. As shown in FIG. 11, however, absolutely the same effects can be obtained if the two ordinary CTDs 10 and 10'' for taking one charge into each of the stages composed of a plurality of transfer electrodes and for transferring the same are used two in number. In this case, two sets of the horizontal switching transistors 8 and 8' are disposed in a manner to correspond to the horizontal CTDs 10 and 10'', respectively, such that they take the charge of the twice ON operations shown in FIG. 7. Specifically, a pulse is applied to the horizontal switching transistors 8 for the period $t_a - t_b$ (or $t'_a - t'_b$) of FIG. 7 to send the charges composed of the vertical smears only to the horizontal CTD 10, and a pulse is applied to the horizontal switching transistors 8' for the period $t_e - t_f$ (or $t'_e - t'_f$) of FIG. 7 to send the signal charges having the vertical smears mixed therein to the horizontal CTD 10''. Moreover, the output voltage of the horizontal CTD 10 is applied, after it has been attenuated to $T_2T_1$ by the voltage adjusting circuit 18, together with the output voltage of the horizontal CTD 10'' to the subtracting circuit 19. As a result, it is possible to obtain the outputs, which are expressed by the foregoing Equations (6) and (7), i.e., the outputs from which the vertical smears are eliminated.

Figure 12:
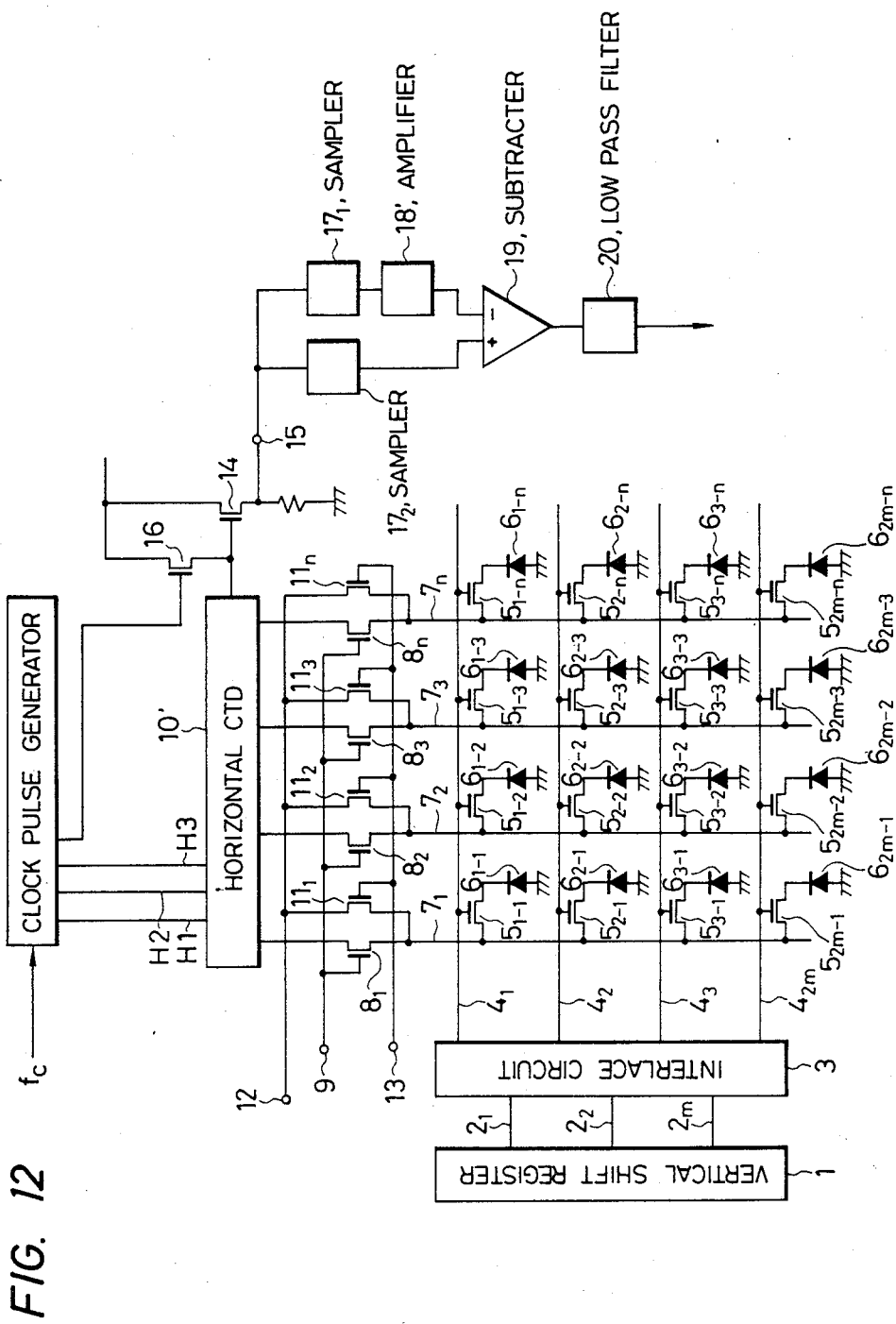
FIG. 12 is a circuit diagram showing the solid state imaging device according to another embodiment of the present invention.

FIG. 12 is a circuit diagram showing the solid state imaging device according to still another embodiment of the present invention.

In the embodiment of FIG. 12, as is different from the structure of the prior art shown in FIG. 1, the horizontal CTD 10' has a three-phase electrode structure, and the sampling circuits $17_1$ and $17_2$, an amplifying circuit 18', the subtracting circuit 19 and the low pass filter 20 are disposed at the output side so that the signal charges having the vertical smears mixed therein in the vertical CTD 10' and the charges composed of the vertical smears only are taken out separately of each other and so that the vertical smears are eliminated by a subtraction.

The horizontal CTD 10' in this embodiment is of the same type as the CTD 10' of the foregoing embodiment of FIG. 4, and its structure and its transfer by the three-phase drive are absolutely the same as those of FIGS. 5A to 5N.

Figure 13:
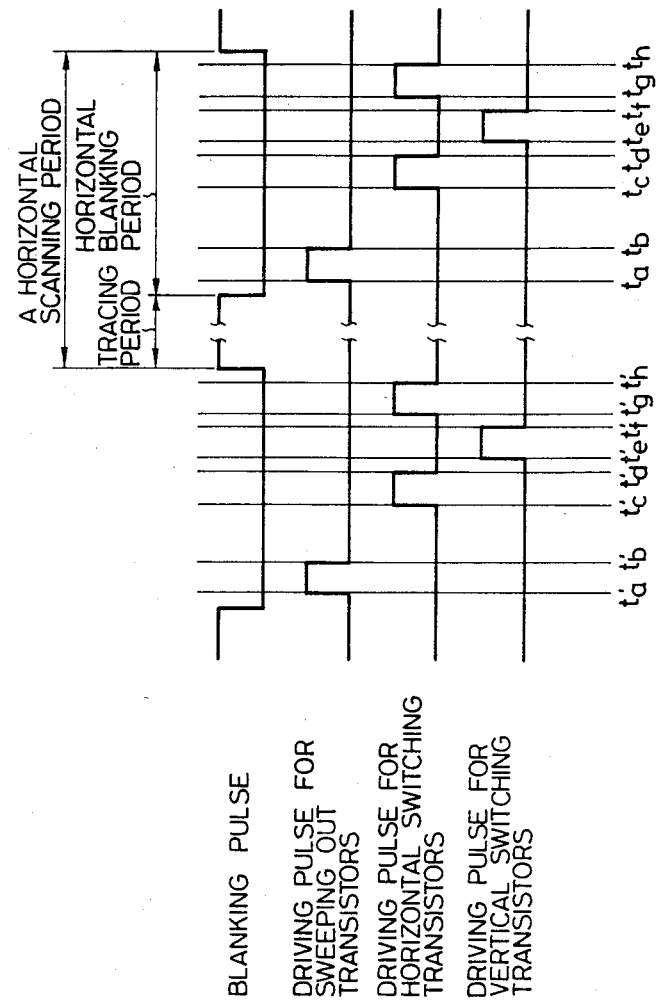
FIG. 13 is a timing chart showing the driving pulses of the embodiment of FIG. 12.
Figure 14:
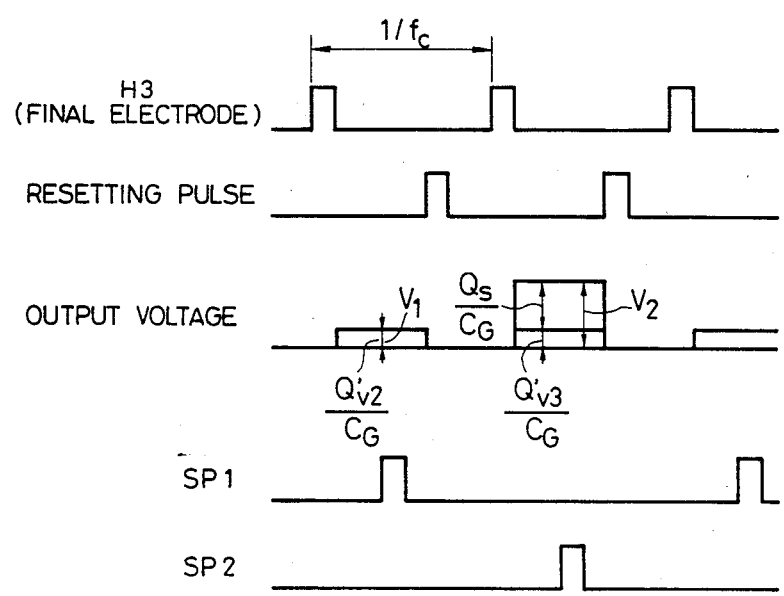
FIG. 14 is a chart showing the output voltage and sampling pulses of the embodiment of FIG. 12.

FIG. 13 is a time chart showing the driving pulses to be applied to the respective switching transistors of FIG. 12, and FIG. 14 is a chart showing the waveforms of the output voltages of the embodiment of FIG. 12

In the embodiment of FIG. 12, as shown in FIG. 13, the sweeping out transistors 11 are turned on for the period $t_a - t_b$ during the horizontal blanking period to sweep out the vertical smear charges $Q'_{V1}$ which are stored on and after the ON period $(t'_g - t'_h)$ of the horizontal switching transistors 8 before the one horizontal scanning period. For the succeeding period $t_c - t_d$, the horizontal switching transistors 8 are turned on to transfer the vertical smear charges $Q'_{V2}(=Q_A)$, which are stored for the period $t_b - t_d$, to the horizontal CTD 10'. These operations for the period $t_c - t_d$ correspond to those for the period $t_1 - t_2$ shown in FIG. 5C. For the succeeding period $t_e - t_f$, the vertical switching transistors 5 are turned on to transfer the signal charges $Q_S$ of the photo diodes 6 to the vertical signal lines 7. By turning on the horizontal switching transistors 8 again for the period $t_g - t_h$, the charges $Q_B$, which is the sum of the aforementioned signal charges $Q_S$ and the vertical smear charges $Q'_{V3}$ stored for the period $t_d - t_h$ are transferred to the horizontal CTD 10'. The operations for the periods $t_d - t_g$ and $t_g - t_h$ correspond to those for the period $t_2 - t_7$ of FIGS. 5D to 5H and the period $t_7 - t_8$ of FIG. 5I, respectively. If, moreover, the horizontal CTD 10' is driven by the three-phase clock pulses shown in FIGS. 6A to 6C while the horizontal switching transistors 8 are being held inconductive during the video period, the two charges $Q_A$ and $Q_B$ can be transferred separately of each other.

In the signal charges $Q_S$, as has been described above, there are mixed the vertical smear charges $Q'_{V3}$ which are stored in the vertical signal lines 7 for the period $t_d - t_h$. If the period $t_b - t_d$ and the period $t_d - t_h$ are designated by $T'_1$ and $T'_2$, respectively, the relationship between the vertical smear charges $Q'_{V2}$ and the vertical smear charges $Q'_{V3}$ mixed in the signal charges $Q_S$ is expressed by the following Equation:

$$Q'_{V2} = \frac{T_1'}{T_2'} \cdot Q'_{V3} \qquad (8)$$

In these ways, from the output of the horizontal CTD 10', both only the vertical smear charges $Q'_{V2}$ and the signal charges $Q_S$ having the vertical smear charges $Q'_{V3}$ mixed therein are alternately sent out in response to the clock frequency $f_c$. These charges are converted by the gate capacitor $C_G$ of the source follower transistor 14 into the voltage signals, as are expressed by the following Equations, and are sent out to the output terminal 15:

$$V_1 = \frac{Q'_{V2}}{C_G} \qquad (9)$$

$$V_2 = \frac{Q'_{V3} + Q_S}{C_G} \qquad (10)$$

One example of these output voltage $V_1$ and $V_2$ is shown in the schematic chart of FIG. 14. More specifically, the charges are sent out to the gate of the source follower transistor 14 by applying the pulse to the final electrode H3, and the charges of the gate are swept out to the outside, before the succeeding charges are transferred from the horizontal CTD 10', by the resetting transistor 16 which is adapted to be turned on by the resetting pulse having a frequency equal to the clock frequency $f_c$. The output voltages $V_1$ and $V_2$, which are obtained alternately in response to the clock frequency $f_c$, are separated by the sampling circuits $17_1$ and $17_2$ shown in FIG. 12. The output voltages $V_1$ and $V_2$ are taken into the sampling circuits $17_1$ and $17_2$, respectively, by applying the sampling pulses SP1 and SP2 shown in FIG. 14. The output voltage $V_1$ separated by the sampling circuit $17_1$ is applied, after it has been amplified to a ratio $T'_2/T'_1$ by the amplifying circuit 18', together with the other output voltage $V_2$ to the subtracting circuit 19. The signal $V'_{out}$ obtained from the subtracting circuit 19 is expressed by the following Equation:

$$V'_{out} = V_2 - \frac{T_2'}{T_1'} \cdot V_1 \qquad (11)$$

$$= \frac{Q_S + Q'_{V3}}{C_G} - \frac{T_2'}{T_1'} \cdot \frac{Q'_{V2}}{C_G}$$

Since the equation of $Q'_{V2} = (T'_1/T'_2) \cdot Q'_{V3}$ holds from the foregoing Equation (8), the above Equation (11) is simplified into the following Equation:

$$V'_{out} = Q_S/C_G \qquad (12)$$

As a result, the signal, which is obtained by applying the output of the subtracting circuit 19 to the low pass filter 20, is cleared of the vertical smears.

Incidentally, the description thus far made is directed to the method in which the signal of the picture elements having the vertical smears mixed therein is sent after the vertical smears have been sent to the horizontal CTD, as shown in FIG. 13. It is, however, apparent that like effects can be obtained even if the vertical smears are sent to the horizontal CTD after the picture element signal having the vertical smears mixed therein has been sent in response to the pulse which is prepared by changing the phase of the driving pulse for driving the vertical switching transistors, as shown in FIG. 17.

Incidentally, in the solid state image sensor thus far described, the noise charges $Q_n$, which are generated when the horizontal switching transistors 8 and the sweeping out transistors 11 are turned on, are sent out to either the horizontal CTD 10' or the sweeping out terminal 12. At this time, since the charges of the vertical signal lines 7 become short by the quantities of the noise charges $Q_n$ sent out, there are left in the vertical signal lines 7 the noise charges $-Q_n$ which have the same magnitude as but the polarity opposite to those noise charges $Q_n$. The noise charges $-Q_n$ of the opposite polarity left on the vertical signal lines 7 are sent out, at the succeeding instant when the horizontal switching transistors 8 or the sweeping out transistors 11 are turned on, together with the noise charges generated at that instant to the horizontal CTD 10' or the sweeping out terminal 13.

Next, the voltages $V'_1$ and $V'_2$ at the output terminal, which include the noise charges, are expressed by the following Equations, if they are taken into consideration:

$$V'_1 = \frac{1}{C_G} \cdot (Q'_{V2} - Q_{n1} + Q_{n2}) \qquad (13)$$

$$= \frac{1}{C_G} \cdot (Q'_{V2} + \sqrt{\overline{Q_{n1}^2} + \overline{Q_{n2}^2}}\,)$$

$$V'_2 = \frac{1}{C_G} \cdot (Q_S + Q'_{V3} - Q_{n2} + Q_{n3}) \qquad (14)$$

$$= \frac{1}{C_G} \cdot (Q_S + Q'_{V3} + \sqrt{\overline{Q_{n2}^2} + \overline{Q_{n3}^2}}\,)$$

Here, reference characters $Q_{n1}$ designate the noise charges when the sweeping out transistors 11 are turned on; characters $Q_{n2}$ designate the noise charges when the horizontal switching transistors 8 are first turned on; and characters $Q_{n3}$ designate the noise charges when the horizontal switching transistors 8 are second turned on.

From the above Equations (13) and (14), the output signal $V''_{out}$ of the subtracting circuit 19 is expressed by the following Equation:

$$V''_{out} = \frac{1}{C_G} \cdot \qquad (15)$$

$$\left\{ Q_S + Q'_{V3} + (Q_{n3} - Q_{n2}) - \frac{T_2'}{T_1'} \cdot (Q'_{V2} + Q_{n2} - Q_{n1}) \right\}$$

$$= \frac{1}{C_G} \cdot \left\{ Q_S + (Q_{n3} - Q_{n2}) - \frac{T_2'}{T_1'} (Q_{n2} - Q_{n1}) \right\}$$

$$= \frac{1}{C_G} \cdot$$

$$\left\{ Q_S + \sqrt{\overline{Q_{n3}^2} + \left(\frac{T_2'}{T_1'} \cdot \overline{Q_{n1}}\right)^2 + \left(1 + \frac{T_2'}{T_1'}\right)^2 \cdot \overline{Q_{n2}^2}} \right\}$$

Since the Equation of $T'_1 \approx T'_2$ substantially holds, the magnitude of the noises to be mixed in the output signal is about $\sqrt{6}$ times as high as that of the noises which are generated by the once operations of the horizontal switching transistors 8 or the sweeping out transistors 11.

Figure 15:
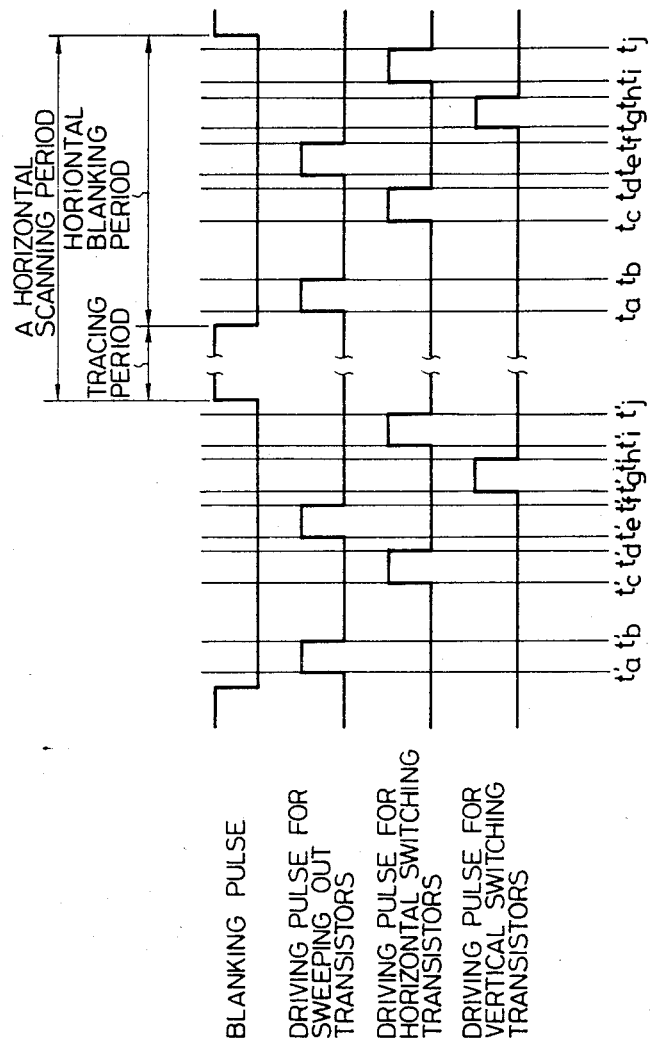
FIG. 15 is a timing chart showing other driving pulses according to the present invention.

FIG. 15 is a timing chart showing the driving pulses in still another embodiment of the present invention.

The operations for the horizontal blanking period, as shown in FIG. 13, are changed into those shown in FIG. 15. As shown in FIG. 15, since the respective sweeping out transistors 11 are turned on before the horizontal switching transistors 8 are turned on, no correlation exists between the noise charges which are mixed into the two charges to be transferred to the horizontal CTD 10'. In this case, the voltage $V''_1$ and $V''_2$ appearing in the output are expressed by the following Equations:

$$V''_1 = \frac{1}{C_G} \cdot (Q'_{V2} - Q_{n1} + Q_{n2}) \tag{16}$$

$$= \frac{1}{C_G} \cdot (Q'_{V2} + \sqrt{\overline{Q^2_{n1}} + \overline{Q^2_{n2}}})$$

$$V''_2 = \frac{1}{C_G} \cdot (Q_S + Q'_{V3} - Q_{n3} + Q_{n4}) \tag{17}$$

$$= \frac{1}{C_G} \cdot (Q_S + Q'_{V3} + \sqrt{\overline{Q^2_{n3}} + \overline{Q^2_{n4}}})$$

Here, characters $Q_{n1}$ and $Q_{n3}$ designate the noise charges which are generated by turning on the sweeping out transistors 11, and characters $Q_{n2}$ and $Q_{n4}$ designate the noise charges which are generated by turning on the horizontal switches 8.

From the above Equations (16) and (17), the output signal $V'''_{out}$ of the subtracting circuit 19 is expressed by the following Equation:

$$V'''_{out} = \frac{1}{C_G} \cdot \left\{ Q_S + (Q_{n4} - Q_{n3}) - \frac{T''_2}{T''_1}(Q_{n2} - Q_{n1}) \right\} \tag{18}$$

$$= \frac{1}{C_G} \cdot$$

$$\left\{ Q_S + \sqrt{\overline{Q^2_{n4}} + \overline{Q^2_{n3}} + \left(\frac{T''_2}{T''_1} \cdot \overline{Q}_{n2}\right)^2 + \left(\frac{T''_2}{T''_1} \cdot \overline{Q}_{n1}\right)^2} \right\}$$

Here, characters $T''_1$ designate the period $t_b - t_d$ shown in FIG. 15, and characters $T''_2$ designate the period $t_f - t_j$. Because of $T''_1 \approx T''_2$, the magnitude of the noises is improved about two times as high as those which are generated by the operations of the horizontal switching transistors 8 or the sweeping out transistors 11.

In the embodiment of FIG. 12, the same effects can be obtained if the CTD having the six-phase electrode structure shown in FIGS. 9A to 9L is used as the horizontal CTD 10'.

Figure 16:
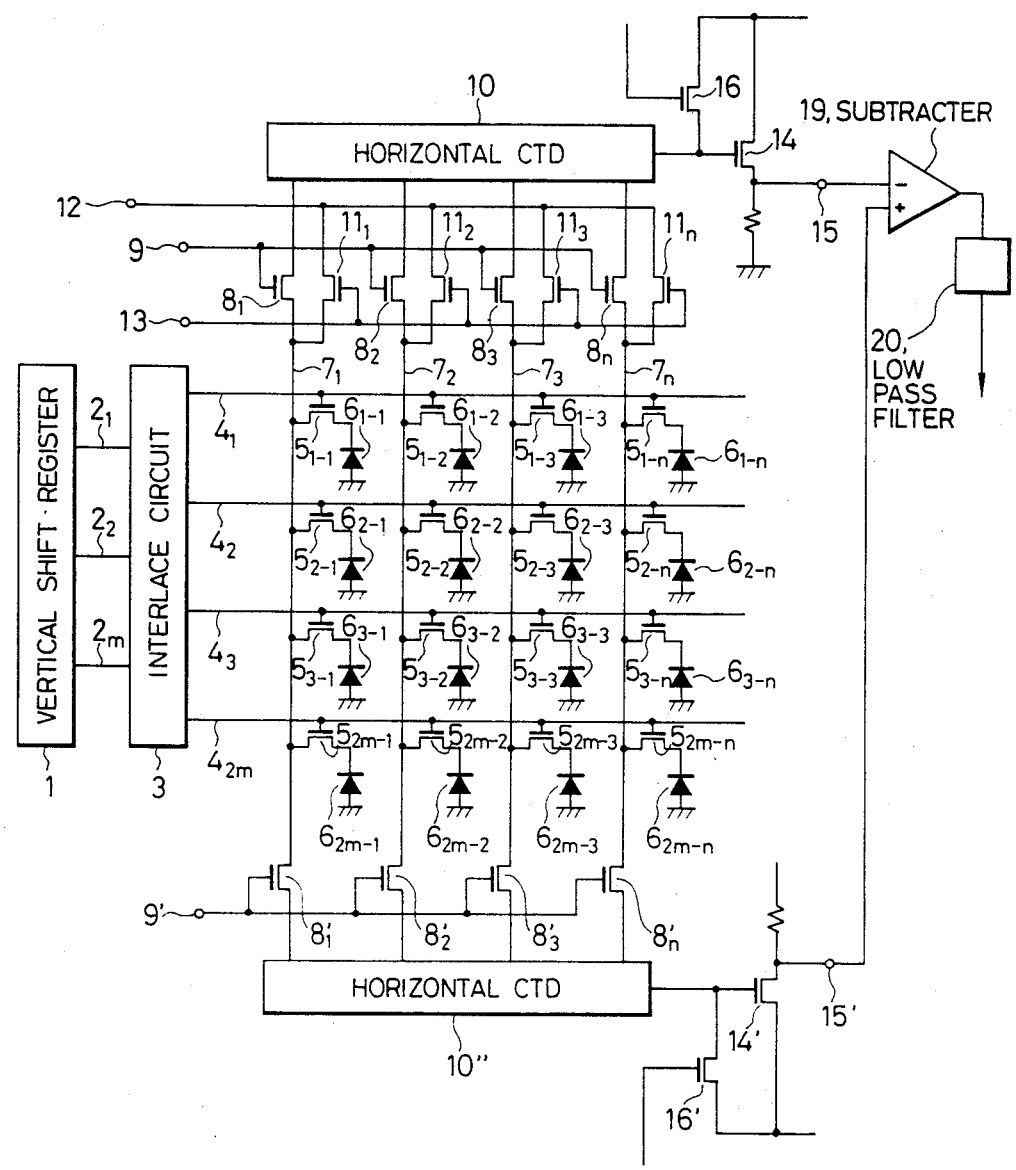
FIG. 16 is a circuit diagram showing a solid state imaging device according to a further embodiment of the present invention.

FIG. 16 is a circuit diagram showing the solid state imaging device according to a further embodiment of the present invention.

As shown in FIG. 16, there are used two sets of the ordinary horizontal CTDs 10 and 10" for transferring a charge in each of the stages composed of plural electrodes. In this case, the horizontal switching transistors $8_1, 8_2, \text{---}, \text{and } 8_n$, and $8'_1, 8'_2, \text{---}, \text{and } 8'_n$ take the charges of the twice ON operations of the horizontal switching transistors shown in FIG. 13.

There appears at the output terminal 15 of the horizontal CTD 10 the voltage $V_1$ which is proportional to the charges $Q'_{V2}$ of the vertical smears, whereas there appears at the output terminal of the horizontal CTD 10" the voltage $V_2$ which is proportional to the signal charges $Q_S$ which has the vertical smear charges $Q'_{V3}$ mixed therein. If $T'_1 \approx T'_2$, the output is expressed by the following Equation by applying both the output voltages to the subtracting circuit 19 so that they may be subjected to the subtraction:

$$V_{out} = \frac{Q_S}{C_G} \tag{19}$$

It is quite natural that the pulses can be applied to the horizontal switching transistors 8 and 8' so that the voltages $V_2$ and $V_1$ may be outputted to the output terminals 15 and 15', respectively.

In this embodiment, too, in order to precisely eliminate the vertical smears, it is preferable to adjust the magnitude of the vertical smear voltage $V_1$ prior to its application to the subtracting circuit 19. This adjustment can be effected either by adjusting the gain of the source follower transistor 14 or by connecting an amplifier having a suitable gain between the output terminal 15 and the subtracting circuit 19.

What is claimed is:

1. A method of reducing the vertical smears generated in a solid state image sensor which comprises:
    a plurality of photoelectric conversion elements arrayed regularly in horizontal and vertical directions;
    a plurality of vertical signal lines for transferring charges in a vertical direction;
    horizontal transfer means including at least one charge transfer device, for transferring charges in a horizontal direction;
    a first group of switches for respectively transferring the signal charges, which are generated in the respective ones of said photoelectric conversion elements in response to an incident ray, to predetermined ones of said vertical signal lines; and
    a second group of switches for transferring said signal charges from said vertical signal lines to said horizontal transfer means,
    wherein for a horizontal blanking period, the signal charges of said photoelectric conversion elements existing on one horizontal line are transferred through said first group of switches, said vertical signal lines and said second group of switches to said horizontal transfer means; and, for a tracing period succeeding said horizontal blanking period, said signal charges are transferred by said horizontal transfer means to the output terminal thereof to obtain a signal corresponding to one horizontal scanning line,
    said method comprising the steps of:
        transferring the smear charges stored on said vertical signal lines to said horizontal transfer means;
        transferring said signal charges from said photoelectric conversion elements to said vertical signal lines and further from said vertical signal lines to said horizontal transfer means;

transferring said smear charges and said signal charges separately of each other to the output terminal of said horizontal transfer means by said horizontal transfer means;

obtaining a smear voltage corresponding to said smear charges and a signal voltage corresponding to said signal charges at the output terminal of said horizontal transfer means;

adjusting the magnitude of said smear voltage at a predetermined ratio in accordance with the ratio of the storage period of the smear charge component mixed in said signal charges to the storage period of said smear charges; and subtracting said adjusted smear voltage from said signal voltage to reduce the smear component contained in said signal voltage.

2. A method of reducing the vertical smears generated in a solid state image sensor which comprises:

a plurality of photoelectric conversion elements arrayed regularly in horizontal and vertical directions;

a plurality of vertical signal lines for transferring charges in a vertical direction;

horizontal transfer means including at least one charge transfer device, for transferring charges in a horizontal direction;

a first group of switches for respectively transferring the signal charges, which are generated in the respective ones of said photoelectric conversion elements in response to an incident ray, to predetermined ones of said vertical signal lines; and a second group of switches for transferring said signal charges from said vertical signal lines to said horizontal transfer means;

wherein for a horizontal blanking period, the signal charges of said photoelectric conversion elements existing on one horizontal line are transferred through said first group of switches, said vertical signal lines and said second group of switches to said horizontal transfer means; and, for a tracing period succeeding said horizontal blanking period, said signal charges are transferred by said horizontal transfer means to the output terminal thereof to obtain a signal corresponding to one horizontal scanning line, said method comprising the steps of:

for said horizontal blanking period transferring the smear charges, which are stored in said vertical signal lines for the preceding tracing period, to said horizontal transfer means by turning on said second group of switches; transferring said signal charges from said photoelectric conversion elements to said vertical signal lines by turning on said first group of switches; and transferring said signal charges to said horizontal transfer means by again turning on said second group of switches;

for the tracing period succeeding said horizontal blanking period transferring said smear charges and said signal charges separately of each other to the output terminal of said horizontal transfer means by said horizontal transfer means; obtaining a smear voltage corresponding to said smear charges and a signal voltage corresponding to said signal charges at the output terminal of said horizontal transfer means; attenuating the magnitude of said smear voltage at a predetermined ratio in accordance with the ratio of the period, which continues from the instant when a first ON state of said second group of switches for a horizontal blanking period succeeding a preceding horizontal blanking period terminates the instant when a second ON state of said second group of switches for said succeeding horizontal blanking period terminates, to the period which continues from the instant when the last ON state of said second group of switches for said preceding horizontal blanking period terminates the instant when said first ON state of said second group of switches for said succeeding horizontal blanking period terminates; and subtracting said attenuated smear voltage from said signal voltage to reduce the smear component contained in said signal voltage.

3. A method of reducing the vertical smears generated in a solid state image sensor which comprises:

a plurality of photoelectric conversion elements arrayed regularly in horizontal and vertical directions;

a plurality of vertical signal lines for transferring charges in a vertical direction;

horizontal transfer means including at least one charge transfer device, for transferring charges in a horizontal direction;

a first group of switches for respectively transferring the signal charges, which are generated in the respective ones of said photoelectric conversion elements in response to an incident ray, to predetermined ones of said vertical signal lines;

a second group of switches for transferring said signal charges from said vertical signal lines to said horizontal transfer means; and a third group of switches for sweeping out the smear charges stored in the respective ones of said vertical signal lines to the outside from said vertical signal lines, wherein for a horizontal blanking period, the signal charges of said photoelectric conversion elements existing on one horizontal lines are transferred through said first group of switches, said vertical signal lines and said second group of switches to said horizontal transfer means; and, for a tracing period succeeding said horizontal blanking period, said signal charges are transferred by said horizontal transfer means to the output terminal thereof to obtain a signal corresponding to one horizontal scanning line, said method comprising the steps of:

at the initial stage of said horizontal blanking period sweeping out the smear charges, which are stored on said vertical signal lines for a tracing period prior to said horizontal blanking period, to the outside;

for the remaining period of said horizontal blanking period transferring the smear charges, which are stored on said vertical signal lines for a portion of said remaining period; and transferring said signal charges from said photoelectric conversion elements to said vertical signal lines and further from said vertical signal lines to said horizontal transfer means; and for a tracing period succeeding said horizontal blanking period transferring said smear charges and said signal charges separately of each other to the output terminal of said horizontal transfer means by said horizontal transfer means; obtaining a smear voltage corresponding to said smear charges and a signal voltage corresponding to said signal charges at the output terminal of said horizontal transfer means; adjusting the magnitude of said smear voltage at a predetermined ratio in accordance with the ratio of the storage period of the smear charge component, which is mixed in the signal charge transferred to said horizontal transfer means, to the storage period of the smear charges which are transferred to said horizontal transfer means; and subtracting said adjusted smear voltage from said signal voltage to reduce the smear component contained in said signal voltage.

4. A method of reducing the vertical smears generated in a solid state image sensor which comprises:

a plurality of photoelectric conversion elements arrayed regularly in horizontal and vertical directions;

a plurality of vertical signal lines for transferring charges in a vertical direction;

horizontal transfer means including at least one charge transfer device, for transferring charges in a horizontal direction;

a first group of switches for respectively transferring the signal charges, which are generated in the respective ones of said photoelectric conversion elements in response to an incident ray, to predetermined ones of said vertical signal lines;

a second group of switches for transferring said signal charges from said vertical signal lines to said horizontal transfer means; and a third group of switches for sweeping out the smear charges stores in the respective ones of said vertical signal lines to the outside from said vertical signal lines, wherein for a horizontal blanking period, the signal charges of said photoelectric conversion elements existing on one horizontal line are transferred through said first group of switches, said vertical signal lines and said second group of switches to said horizontal transfer means; and, for a tracing period succeeding said horizontal blanking period, said signal charges are transferred by said horizontal transfer means to the output terminal thereof to obtain a signal corresponding to one horizontal scanning line, said method comprising the steps of:

for said horizontal blanking period sweeping out the smear charges, which are stored on said vertical signal lines for a tracing period prior to said horizontal blanking period, to the outside by turning on said third group of switches, subsequently transferring the smear charges, which are stored on said vertical signal lines on and after the termination of the ON state of said third group of switches, to said horizontal transfer means by turning on said second group of switches; subsequently transferring said signal charges from said photoelectric conversion elements to said vertical signal lines by turning on said first group of switches; and subsequently transferring said signal charges from said vertical signal lines to said horizontal transfer means by again turning on said second group of switches; and for a tracing period succeeding said horizontal blanking period transferring said smear charges and said signal charges separately of each other to the output terminal of said horizontal transfer means by said horizontal transfer means; obtaining a smear voltage corresponding to said smear charges and a signal voltage corresponding to said signal charges at the output terminal of said horizontal transfer means; adjusting the magnitude of said smear voltage at a predetermined ratio in accordance with the ratio of the storage period of the smear charge component, which is mixed in the signal charge transferred to said horizontal transfer means, to the storage period of the smear charges which are transferred to said horizontal transfer means; and subtracting said adjusted smear voltage from said signal voltage to reduce the smear component contained in said signal voltage.

5. A method of reducing the vertical smears generated in a solid state image sensor which comprises:

a plurality of photoelectric conversion elements arrayed regularly in horizontal and vertical directions;

a plurality of vertical signal lines for transferring charges in a vertical direction;

horizontal transfer means including at least one charge transfer device, for tranferring charges in a horizontal direction;

a first group of switches for respectively transferring the signal charges, which are generated in the respective ones of said photoelectric conversion elements in response to an incident ray, to predetermined ones of said vertical signal lines;

a second group of switches for transferring said signal charges from said vertical signal lines to said horizontal transfer means; and a third group of switches for sweeping out the smear charges stored in the respective ones of said vertical signal lines to the outside from said vertical signal lines;

wherein for a horizontal blanking period, the signal charges of said photoelectric conversion elements existing on one horizontal line are transferred through said first group of switches, said vertical signal lines and said second group of switches to said horizontal transfer means; and, for a tracing period succeeding said horizontal blanking period, said signal charges are transferred by said horizontal transfer means to the output terminal thereof to obtain a signal corresponding to one horizontal scanning line, said method comprising the steps of:

for said horizontal blanking period sweeping out the smear charges, which are stored on said vertical signal lines for a tracing period prior to said horizontal blanking period, to the outside by turning on said third group of switches; subsequently transferring the smear charges, which are stored on said vertical signal lines on and after the termination of the ON state of said third group of switches, to said horizontal transfer means by turning on said second group of switches; subsequently turning on said third group of switches again for substantially the same period as said first ON period; subsequently transferring said signal charges from said photoelectric conversion elements to said vertical signal lines by turning on said first group of switches; and subsequently transferring said signal charges from said vertical signal lines to said horizontal transfer means by again turning on said second group of switches; and for a tracing period succeeding said horizontal blanking period transferring said smear charges and said signal charges separately of each other to the output terminal of said horizontal transfer means by said horizontal transfer means; obtaining a smear voltage corresponding to said smear charges and a signal voltage corresponding to said signal charges at the output terminal of said horizontal transfer means; adjusting the magnitude of said smear voltage at a predetermined ratio in accordance with the ratio of the storage period of the smear charge component, which is mixed in the signal charge transferred to said horizontal transfer means, to the storage period of the smear charges which are transferred to said horizontal transfer means; and subtracting said adjusted smear voltage from said signal voltage to reduce the smear component contained in said signal voltage.

6. A method of reducing the vertical smears generated in a solid state image sensor which comprises:

a plurality of photoelectric conversion elements arrayed regularly in horizontal and vertical directions;

a plurality of vertical signal lines for transferring charges in a vertical direction;

horizontal transfer means including at least one charge transfer device, for transferring charges in a horizontal direction;

a first group of switches for respectively transferring the signal charges, which are generated in the respective ones of said photoelectric conversion elements in response to an incident ray, to predetermined ones of said vertical signal lines;

a second group of switches for transferring said signal charges from said vertical signal lines to said horizontal transfer means; and a third group of switches for sweeping out the smear charges stored in the respective ones of said vertical signal lines to the outside from said vertical signal lines, wherein for a horizontal blanking period, the signal charges of said photoelectric conversion elements existing on one horizontal line are transferred through said first group of switches, said vertical signal lines and said second group of switches to said horizontal transfer means; and, for a tracing period succeeding said horizontal blanking period, said signal charges are transferred by said horizontal transfer means to the output thereof to obtain a signal corresponding to one horizontal scanning line, said method comprising the steps of:

for said horizontal blanking period sweeping out the smear charges, which are stored on said vertical signal lines for a tracing period prior to said horizontal blanking period, to the outside by turning on said third group of switches; subsequently transferring said signal charges from said photoelectric conversion elements to said vertical signal lines by turning on said first group of switches; subsequently transferring said signal charges from said vertical signal lines to said horizontal transfer means by turning on said second group of switches; and subsequently transferring the smear charges, which are stored on said vertical signal lines on and after the termination of said first ON state of said second group of switches, to said horizontal transfer means by again turning on said second group of switches; and for a tracing period succeeding said horizontal blanking period transferring said smear charges and said signal charges separately of each other to the output terminal of said horizontal transfer means by said horizontal transfer means; obtaining a smear voltage corresponding to said smear charges and a signal voltage corresponding to said signal charges at the output terminal of said horizontal transfer means; adjusting the magnitude of said smear voltage at a predetermined ratio in accordance with the ratio of the storage period of the smear charge component, which is mixed in the signal charge transferred to said horizontal transfer means, to the storage period of the smear charges which are transferred to said horizontal transfer means; and subtracting said adjusted smear voltage from said signal voltage to reduce the smear component contained in said signal voltage.

7. A solid state imaging device comprising:

a plurality of photoelectric conversion elements arrayed regularly in horizontal and vertical directions;

a plurality of vertical signal lines for transferring charges in a vertical direction;

horizontal transfer means including at least one charge transfer device, for transferring charges in a horizontal direction;

a first group of switches for respectively transferring the signal charges, which are generated in the respective ones of said photoelectric conversion elements in response to an incident ray, to predetermined ones of said vertical signal lines;

a second group of switches for transferring charges on said vertical signal lines from said vertical signal lines to said horizontal transfer means;

pulse generating means for said first group of switches and pulse generating means for said second group of switches, for respectively generating a pulse for controlling said first group of switches and a pulse for controlling said second group of switches so that both the smear charges stored on said vertical signal lines and the signal charges transferred from said photoelectric conversion elements through said first group of switches to said vertical signal lines may be transferred separately of each other to said horizontal transfer means;

means for converting the smear charges and the signal charges, both of which are transferred by said horizontal transfer means, into a smear voltage and a signal voltage, respectively;

means for adjusting the magnitude of said smear voltage at a predetermined ratio in accordance with the ratio of the storage period of the smear charge component, which is mixed in said signal charges, to the storage period of said smear charges; and means for subtracting the output voltage of said adjusting means from said signal voltage to reduce the smear component contained in said signal voltage.

8. A solid state imaging device comprising:

a plurality of photoelectric conversion elements arrayed regularly in horizontal and vertical directions;

a plurality of vertical signal lines for transferring charges in a vertical direction;

horizontal transfer means including at least one charge transfer device, for transferring charges in a horizontal direction;

a first group of switches for respectively transferring the signal charges, which are generated in the respective ones of said photoelectric conversion elements in response to an incident ray, to predetermined ones of said vertical signal lines;

a second group of switches for transferring charges on said vertical signal lines from said vertical signal lines to said horizontal transfer means;

pulse generating means for said first group of switches and pulse generating means for said second group of switches, for respectively generating a pulse for controlling said first group of switches and a pulse for controlling said second group of switches to turn on for a horizontal blanking period, first said second group of switches so that the smear charges stored on said vertical signal lines for a preceding tracing period may be transferred to said horizontal transfer means; second said first group of switches so that said signal charges may be transferred from said photoelectric conversion elements to said vertical signal lines; and third said second group of switches again so that said signal charges may be transferred to said horizontal transfer means;

means for converting the smear charges and the signal charges, both of which are transferred by said horizontal transfer means, for a tracing period succeeding said horizontal blanking period into a smear voltage and a signal voltage, respectively;

means for attenuating the magnitude of said smear voltage at a predetermined ratio in accordance with the ratio of the period, which continues from the instant when a first ON state of said second group of switches for a horizontal blanking period succeeding a preceding horizontal blanking period terminates to the instant when a second ON state of said second group of switches for said succeeding horizontal blanking period terminates, to the period which continues from the instant when the last ON state of said second group of switches for said preceding horizontal blanking period terminates to the instant when said first ON state of said second group of switches for said succeeding horizontal blanking period terminates; and means for subtracting the output voltage of said attenuating means from said signal voltage to reduce the smear component contained in said signal voltage.

9. A solid state imaging device comprising:

a plurality of photoelectric conversion elements arrayed regularly in horizontal and vertical directions;

a plurality of vertical signal lines for transferring charges in a vertical direction;

horizontal transfer means including at least one charge transfer device, for transferring charges in a horizontal direction;

a first group of switches for respectively transferring the signal charges, which are generated in the respective ones of said photoelectric conversion elements in response to an incident ray, to predetermined ones of said vertical signal lines;

a second group of switches for transferring charges on said vertical signal lines from said vertical signal lines to said horizontal transfer means;

a third group of switches for sweeping out the smear charges, which are stored on the respective ones of said vertical signal lines, from said vertical signal lines to the outside;

pulse generating means for said third group of switches, for generating a pulse for controlling said third group of switches at the initial stage of a horizontal blanking period so that the smear charges stored on said vertical signal lines for a tracing period preceding said horizontal blanking period may be swept out to the outside;

pulse generating means for said first group of switches and pulse generating means for said second group of switches, for respectively generating a pulse for controlling said first group of switches and a pulse for controlling said second group of switches for the remaining period of said horizontal blanking period so that the smear charges stored on said vertical signal lines for a portion of said remaining period may be transferred to said horizontal transfer means, so that said signal charges may be transferred from said photoelectric conversion elements to said vertical signal lines, and so that said signal charges may be transferred from said vertical signal lines to said horizontal transfer means;

means for converting the smear charges and the signal charges, both of which are transferred by said horizontal transfer means, for a tracing period succeeding said horizontal blanking period into a smear voltage and a signal voltage, respectively;

means for adjusting the magnitude of said smear voltage at a predetermined ratio in accordance with the ratio of the storage period of the smear charge component, which is mixed in said signal charges transferred to said horizontal transfer means, to the storage period of said smear charges transferred to said horizontal transfer means; and means for subtracting the output voltage of said adjusting means from said signal voltage to reduce the smear component contained in said signal voltage.

10. A solid state imaging device according to claim 7, wherein said horizontal transfer means includes one charge transfer device having a plurality of stages each composed of three three-phase driven storage regions, and wherein said charge transfer device transfers said smear charges and said signal charges separately of each other by storing said smear charges and said signal charges separately of each other in two of said three storage regions of each of said stages.

11. A solid state imaging device according to claim 8, wherein said horizontal transfer means includes one charge transfer device having a plurality of stages each composed of three three-phase driven storage regions, and wherein said charge transfer device transfers said smear charges and said signal charges separately of each other by storing said smear charges and said signal charges separately of each other in two of said three storage regions of each of said stages.

12. A solid state imaging device according to claim 9, wherein said horizontal transfer means includes one charge transfer device having a plurality of stages each composed of three three-phase driven storage regions, and wherein said charge transfer device transfers said smear charges and said signal charges separately of each other by storing said smear charges and said signal charges separately of each other in two of said three storage regions of each of said stages.

13. A solid state imaging device according to claim 7, wherein said horizontal transfer means includes one charge transfer device having a plurality of stages each composed of six-phase driven six storage regions, and wherein said charge transfer device transfers said smear charges and said signal charges separately of each other.

14. A solid state imaging device according to claim 8, wherein said horizontal transfer means includes one charge transfer device having a plurality of stages each composed of six-phase driven six storage regions, and wherein said charge transfer device transfers said smear charges and said signal charges separately of each other.

15. A solid state imaging device according to claim 9, wherein said horizontal transfer means includes one charge transfer device having a plurality of stages each composed of six-phase driven six storage regions, and wherein said charge transfer device transfers said smear charges and said signal charges separately of each other.

16. A solid state imaging device according to claim 7, wherein said horizontal transfer means includes two charge transfer devices so that said smear charges are transferred by one of said two charge transfer devices whereas said signal charges are transferred by the other.

17. A solid state imaging device according to claim 8, wherein said horizontal transfer means includes two charge transfer devices so that said smear charges are transferred by one of said two charge transfer devices whereas said signal charges are transferred by the other.

18. A solid state imaging device according to claim 9, wherein said horizontal transfer means includes two charge transfer devices so that said smear charges are transferred by one of said two charge transfer devices whereas said signal charges are transferred by the other.

* * * * *